S. A. Jewett.
Melodeon.
No. 1653. Reissued Apl. 19. 1864.
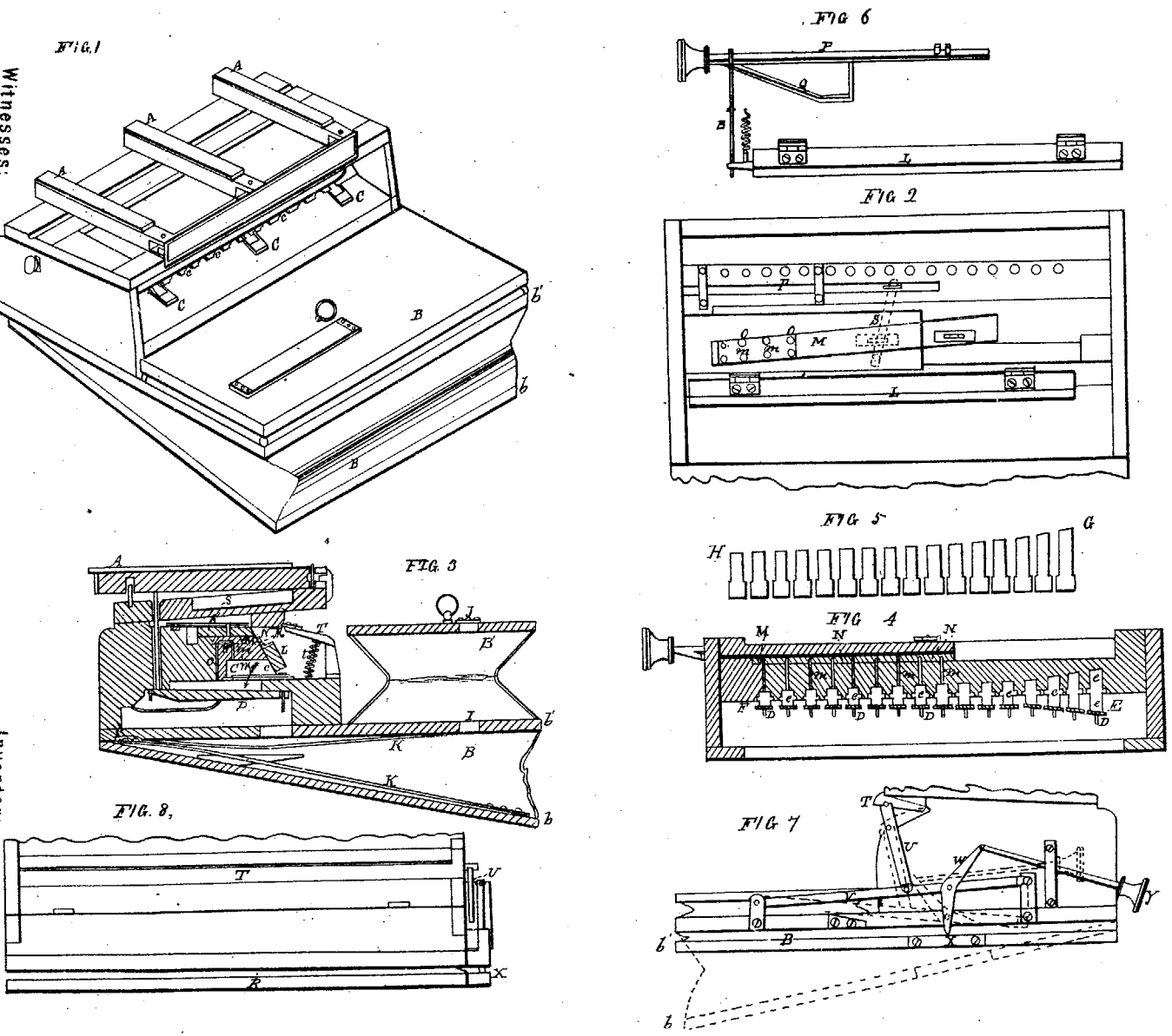
Witnesses:
Geo Hall
W H Partridge
Inventor:
S A Jewett

UNITED STATES PATENT OFFICE.

STANLEY A. JEWETT, OF CLEVELAND, OHIO.

IMPROVEMENT IN MELODEONS.

Specification forming part of Letters Patent No. 18,399, dated October 13, 1857; Reissue No. 1,653, dated April 19, 1864.

*To all whom it may concern:*

Be it known that I, STANLEY A. JEWETT, of Cleveland, in the county of Cuyahoga and State of Ohio, have invented new and useful Improvements in the Construction of Melodeons; and I do hereby declare that the following is a full and complete description of the construction and operation of the same, reference being had to the accompanying drawings, making gart of this specification.

The nature of my invention consists, first, in graduating the quantity of space contained in the air-chambers above and below each particular reed upon a geometrical scale, by which a uniformity of volume of sound is produced, compared with the particular key or reed; second, in producing a perfect mute, whereby any one of two or more sets of reeds may be used by one valve; and, third, in the arrangement of devices by which the swell-valve is operated by the expansion and contraction of the bellows, without the intervention of a pedal, producing a gradual swell and diminuendo, the same being under the most perfect control of the musician.

Figure 1 is a perspective view of a keyboard, reeds, and bellows. Fig. 2 is a horizontal section showing the mute. Fig. 3 is a vertical section. Fig. 4 is a section showing the air-chambers above and below the reeds, drawn upon a geometrical scale. Fig. 5 shows the horizontal depth of these chambers. Fig. 6 is a section showing the manner of operating the mute. Fig. 7 shows the arrangement for operating the swell-valve, and Fig. 8 shows another view of the same.

Like letters refer to like parts.

In Figs. 1 and 3, A represents the keys. B and B′ represent the bellows, and C the reeds. The spaces *c c c*, &c., are seats for those reeds not represented in the drawings. In Fig. 4 the empty reed-seats are also represented by *c c c*, &c. These are all placed exactly upon a horizontal line. The spaces above and below represent the air-chambers. In Fig. 3 the reed is represented in place at C.

In the usual mode of construction the reed-board is divided into three sections, the air-chambers *e* above and below the reeds in each of these being the same—that is, all the spaces in each particular division are alike, the change from one division to another being sudden.

In my improved mode of construction I will assume that for the lowest note in the scale the air-chamber above the reeds should be one inch in depth, and a corresponding amount of space below or between the reed and valve D, Figs. 3 and 4. The next reed in the ascending scale should have the air-chambers a trifle less, and it has been determined by experiment that the line bounding the air-chambers should be constructed upon a true geometrical scale, approaching the line upon which the reeds are placed in a constantly-decreasing ratio, as is shown at one view in the scale E F, Fig. 4.

The necessity for making the chambers upon a scale as indicated above is apparent when it is considered that the lowest notes require a greater amount of air in which to vibrate than the higher notes; that should a reed or note in alto be placed in a chamber of suitable size for a note in bass a full and correct tone could not be obtained, and vice versa and the nearer we approach to this geometrical scale the more perfect will be the tone; but it is not necessary or essential that this scale should be governed wholly by the depth above and below the reeds. A horizontal depth should also be included, as is indicated by the line G H in Fig. 5. It is the quantity of space that is required, but this should be so arranged as to present the smallest practicable amount of inner wall-surface to the chambers. The reeds are operated by exhausting the air from the bellows B′ by expanding upward the bellows B′, the air from B passing into B′ through the valve I, Fig. 3. By contracting B′ the air escapes at the valve J. The bellows B are forcibly expanded by the steel spring K, and thus a current of air is forced to pass through the reeds C upon opening the valve D by pressure upon the key A, the air passing in the direction of the arrows in Fig. 3.

I will now proceed to describe the manner of forming a perfect mute. The object of forming this mute is, that where an instrument is constructed with two or more sets of reeds any one or more sets may be used alone by one valve. In the ordinary mode of constructing instru ments these mutes are produced by a valve, L, that fits the opening into the chamber *e*, Figs. 2, 3, and 6. Owing to the imperfection of mechanical structures, these mute-valves cannot be made sufficiently tight to prevent entirely the passage of air. Consequently when the mute-valve is closed a small quantity of air will escape through the lips of the valve and pass through the reeds, causing them to vibrate, producing an indistinct humming sound.

My method of producing a perfect mute is as follows: I perforate the back part of the air-chamber *e* with small holes *m*, Fig. 3. The upper ends of these holes are seen at *m*, Fig. 2, and communicate with similar holes in the sliding valve or stop M, Figs. 4, 2, and 3. In Fig. 2 it is represented as being moved out of its proper place for the purpose of showing the holes *m* at the point where they intersect the holes in the slide-valve M. The hole that passes through the slide-valve M is shown at N, Fig. 3, and also in longitudinal section in Fig. 4. This hole that extends into this slide-valve connects with a hole, O, that leads into the air-chamber that is situated below the reed C. The sliding valve M and the mute-valve L are both operated by the stop P, Figs. 2 and 6. When this stop is drawn out, the inclined plane Q, Fig. 6, depresses the short end of the lever R, and this elevates the long arm of the lever R and opens the valve L, at the same time the sliding valve M is moved by the lever represented by the dotted lines at S, Figs. 2 and 3, so that the holes *m* N O do not come in contact—or, in other words, the communication from the chamber above the reed with that below is cut off. When it is desired to mute this set of reeds, the stop P is shoved in. This allows the valve L to close by means of a coiled spring, which holds it in place, and at the same time it moves the slide-valve M, so that a free communication is established through the holes *m* N O. Now, in performing upon the instrument, when one or more sets of reeds are muted the tendency is for air to pass through the lips of the valve L, and were there no other passage it must pass through the reeds, producing the humming sound before referred to; but the holes *m* N O affording a free passage for the air, it passes from above the reed to the chamber below without acting upon the tongue of the reed, and consequently a perfect mute is produced by closing the valve L and opening the communication between the upper and lower chambers by means of the holes *m* N O.

The swell or crescendo and diminuendo in my improved melodeon is automatic, and is produced by acting upon the swell-valve T by means of the upward pressure of the bottom board, *b*, or contraction and expansion of the bellows B. In Figs. 7 and 8 the several parts of this device are represented. T is the swell-valve, (seen also at T, Fig. 3.) This valve is held in place by the coiled spring *t*. A rod, U, Figs. 7 and 8, supports the valve T by a pin projecting from the end thereof. This rod U is attached to the horizontal lever V, Fig. 7. The lever V is operated by a cam-lever, W, the lower end of which rests upon a projection, X, upon the bottom board, *b*, of the bellows B. When the bellows are extended, as seen at *b b′*, Figs. 1, 3, and 7, the projection X is not in contact with the cam-lever W. Consequently the arm V is pushed downward by the valve T, which is kept closed by the coiled spring *t*. Now, by exhausting the bellows B, as before described, the bottom board, *b*, is raised to *b′*, the projection X comes in contact with the cam-lever W, and the swell-valve is opened gradually—a little at first, but increasing with the strength of the current of air forced through the reeds, for the more perfect the exhaustion of the bellows B the stronger is the current of air, and consequently the stronger is the tone produced. It will be observed that this swell increases with the increase of force applied to the instrument, and diminishes in the same manner, making a perfect swell, and this, too, without the intervention of a separate pedal. In this way two pedals may be used (one by each foot) to exhaust the bellows, giving double power to the instrument. An arrangement of this character is necessary in the large-sized instruments, because one pedal is not sufficient to exhaust (or inflate) the bellows.

If it be desirable to let the swell-valve remain closed during the performance of a part or the whole of a piece, it can be done by throwing the cam-lever W back to the position indicated by the dotted lines by means of the stop Y, when the swell-valve T will remain closed.

What I claim as my improvement, and desire to secure by Letters Patent, is—

1. The production of a perfect mute by combining the action of the air-passages *m* N O, or their equivalents, with the mute-valve L, as herein set forth.

2. The formation of a gradual swell or crescendo and diminuendo by means of operating the swell-valve T by the contraction and expansion of the bellows, or its equivalent, as herein specified.

STANLEY A. JEWETT.

Witnesses:
W. H. BURRIDGE,
C. C. MORGAN.